(12) United States Patent
Young

(10) Patent No.: US 6,978,336 B1
(45) Date of Patent: Dec. 20, 2005

(54) METHOD AND STRUCTURE FOR ALLOCATING SITES IN AN EXPANDED SCB ARRAY

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 706 days.

(21) Appl. No.: 10/002,869

(22) Filed: Dec. 5, 2001

(51) Int. Cl.⁷ .................. G06F 13/14; G06F 12/00; G06F 13/00
(52) U.S. Cl. .................. 710/305; 711/170; 711/173
(58) Field of Search ................. 711/170, 173; 710/305

(56) References Cited

U.S. PATENT DOCUMENTS

| | | | | |
|---|---|---|---|---|
| 5,564,023 A | * | 10/1996 | Young ...................... | 710/100 |
| 5,625,800 A | * | 4/1997 | Brayton et al. ........... | 703/23 |
| 5,649,142 A | * | 7/1997 | Lavelle et al. ........... | 711/209 |
| 5,659,690 A | * | 8/1997 | Stuber et al. ............ | 710/307 |
| 5,875,464 A | * | 2/1999 | Kirk ........................ | 711/129 |
| 6,240,482 B1 | * | 5/2001 | Gates et al. .............. | 710/306 |
| 6,651,136 B2 | * | 11/2003 | Percival .................. | 711/113 |

* cited by examiner

Primary Examiner—Glenn A. Auve
Assistant Examiner—Nimesh Patel
(74) Attorney, Agent, or Firm—Gunnison, McKay & Hodgson, L.L.P.; Forrest Gunnison

(57) ABSTRACT

A parallel SCSI host adapter uses an expanded SCB array for both non-Packetized and Packetized SCSI Protocols. The expanded SCB array is partitioned into a low page and a high page. SCBs for non-Packetized SCSI Protocol target devices that utilize a one-byte tag are stored in the low page and the storage site number is the tag. SCBs for Packetized SCSI Protocol target devices that utilize a multi-byte tag are stored on both the low page and the high page. For Packetized SCSI Protocol target devices, the two-bytes required to identify the page and the number of the storage site in the page are used as the tag. SCBs for Packetized SCSI Protocol target devices are stored in the low page only if there are no available storage sites in the high page.

20 Claims, 3 Drawing Sheets

US 6,978,336 B1

METHOD AND STRUCTURE FOR ALLOCATING SITES IN AN EXPANDED SCB ARRAY

BACKGROUND OF THE INVENTION

1. Field of the Invention

The present invention relates generally to SCSI host adapters, and in particular to accessing a single SCB array associated with a SCSI host adapter for both Packetized and non-Packetized protocols.

2. Description of Related Art

Prior art parallel SCSI host adapters have utilized a hardware I/O control block array to store hardware I/O control blocks, e.g., a sequencer control block (SCB) array to store SCBs. A driver executing on a host system constructed each SCB. The driver constructed the SCB and placed all the information in the SCB that was required by the host adapter to deliver a command to a SCSI target and to execute that command.

The SCB included a storage site location in the SCB array for the SCB. When the storage site location was loaded in a SCB array pointer register in the host adapter, the storage site for the SCB in the SCB array was addressed. The SCB also included a command block (CDB) that was delivered by the host adapter to the SCSI target. See for example, commonly assigned U.S. Pat. No. 5,659,690 entitled "Programmably Configurable Host Adapter Integrated Circuit including a RISC Processor," of Craig A. Stuber et al. issued on Aug. 19, 1997, which is incorporated wherein by reference in its entirety. See also, commonly assigned U.S. Pat. No. 5,625,800 entitled "A Sequencer Control Block Array External To A Host Adapter Integrated Circuit" of Michael D. Brayton et al. issued on Apr. 29, 1997, and U.S. Pat. No. 5,564,023 entitled "Method for Accessing A Sequencer Control Block By A Host Adapter Integrated Circuit" of B. Arlen Young issued on Oct. 8, 1996, each of which is incorporated herein by reference in its entirety.

Upon construction of the SCB by the driver, the SCB was transferred from the host system to the host adapter. Various techniques for transferring SCBs from a host system to a host adapter are known.

The prior art SCB array had 255 storage sites available. In particular, one byte was available for specifying an address of a storage location for a SCB within the SCB array. This limited the total number of storage sites to 256, but one storage address was required for an invalid address, and consequently only 255 storage sites in the SCB array had valid addresses.

For tagged queuing, the one-byte tag delivered to a tagged queuing SCSI target had a value equal to the number of the SCB array site containing the SCB for that SCSI target. At any given time, there can be a large number of SCBs in the SCB array for which commands have been delivered to the tagged queuing SCSI target.

When the tagged queuing SCSI target reconnected to the host adapter, the tagged queuing SCSI target returned the one-byte tag to identify the SCB that contained the command for which the target was reconnecting. The host adapter sequencer and/or hardware circuits used the one-byte tag, without modification, to identify the corresponding SCB in the SCB array. In particular, upon receiving the one-byte tag from the reconnecting target, the one-byte tag was simply loaded into the one-byte host adapter SCB array pointer register to access the appropriate SCB.

Non-Packetized SCSI tagged queuing is limited to one-byte tags. However, Packetized SCSI tagged queuing uses a two-byte tag. The same method can be used for a reconnecting target with the Packetized SCSI Protocol in that the two-byte tag is used as a two-byte pointer to the SCB storage site in the SCB array. This scheme increases that possible SCB array size to 65,535 storage sites. However, since SCB array sizes greater than two hundred fifty-six require two-byte pointers, there is a problem using such arrays with non-Packetized SCSI that has only a single byte tag.

SUMMARY OF THE INVENTION

A paged hardware I/O command block array in a SCSI host adapter system alleviates the problems with accessing the prior art array with different size tag values. In particular, with a paged hardware I/O command block array, both non-Packetized SCSI Protocol target devices and Packetized SCSI Protocol target devices be supported at the same time. There is no restriction on how a SCSI bus is populated with target devices.

In one embodiment of the present invention, a method for using a hardware I/O control block array by a parallel SCSI host adapter includes partitioning the hardware I/O control block array for the parallel SCSI host adapter into first and second pages. Only the first page is used for non-Packetized SCSI Protocol hardware I/O control block storage. Both the first and second pages are used for Packetized SCSI Protocol hardware I/O control block storage. However, the first page is used for storing Packetized SCSI hardware I/O control blocks only when all available storage sites on the second page are used.

In one embodiment, a driver for the parallel SCSI host adapter maintains a first page free site queue for the first page of the hardware I/O control block array. The driver also maintains a second page free site queue for the second page of the hardware I/O control block array.

The parallel SCSI host adapter uses a hardware I/O control block array pointer having a low byte and a high byte to address a storage site in the hardware I/O control block array. For a non-Packetized SCSI Protocol reconnecting target, a tag from the reconnecting target is loaded into the low byte only. The high byte is loaded with a zero value. For a Packetized SCSI. Protocol reconnecting target, a tag from the reconnecting target is loaded into the low byte and the high byte. Hence, upon reconnection of a target device, the hardware I/O control block array pointer addresses the storage site in the hardware I/O control block array containing the hardware I/O control block associated with the reconnecting target.

In another embodiment of the present invention, a system includes a parallel SCSI host adapter that in turn includes a sequencer and a hardware I/O control block array pointer coupled to the sequencer. The pointer has a low byte and a high byte.

The system also includes a memory coupled to the hardware I/O control block array pointer. This memory includes a hardware I/O control block array. The hardware I/O control block array includes a plurality of pages including a low page and a high page. The low page includes a plurality of hardware I/O control block storage sites equal to a number of unique tag values that can be returned by a non-Packetized SCSI Protocol tagged queue target reconnecting to the parallel SCSI host adapter. The high page includes another plurality of hardware I/O control block storage sites.

In one embodiment, the memory is external to the parallel SCSI host adapter. In another embodiment, the memory is internal to the parallel SCSI host adapter.

The system further includes a driver coupled to the parallel SCSI host adapter. The driver allocates and de-allocates storage sites in the hardware I/O control block array. Specifically, in one embodiment, the driver allocates sites for non-Packetized SCSI hardware I/O control blocks only in the low page. In this embodiment, the driver allocates sites for Packetized SCSI hardware I/O control blocks in the low page and in the high page. However, the driver allocates sites for Packetized SCSI hardware I/O control blocks in the low page only when all available sites in the high page are used. The system also includes a low page free site queue coupled to the driver and a high page free site queue coupled to the driver.

BRIEF DESCRIPTION OF THE DRAWINGS

In the drawings and the following detailed description, elements with the same reference numeral are the same element. Also, the first digit of a reference numeral for an element indicates the first drawing in which that element appeared.

DETAILED DESCRIPTION

Figure 1:
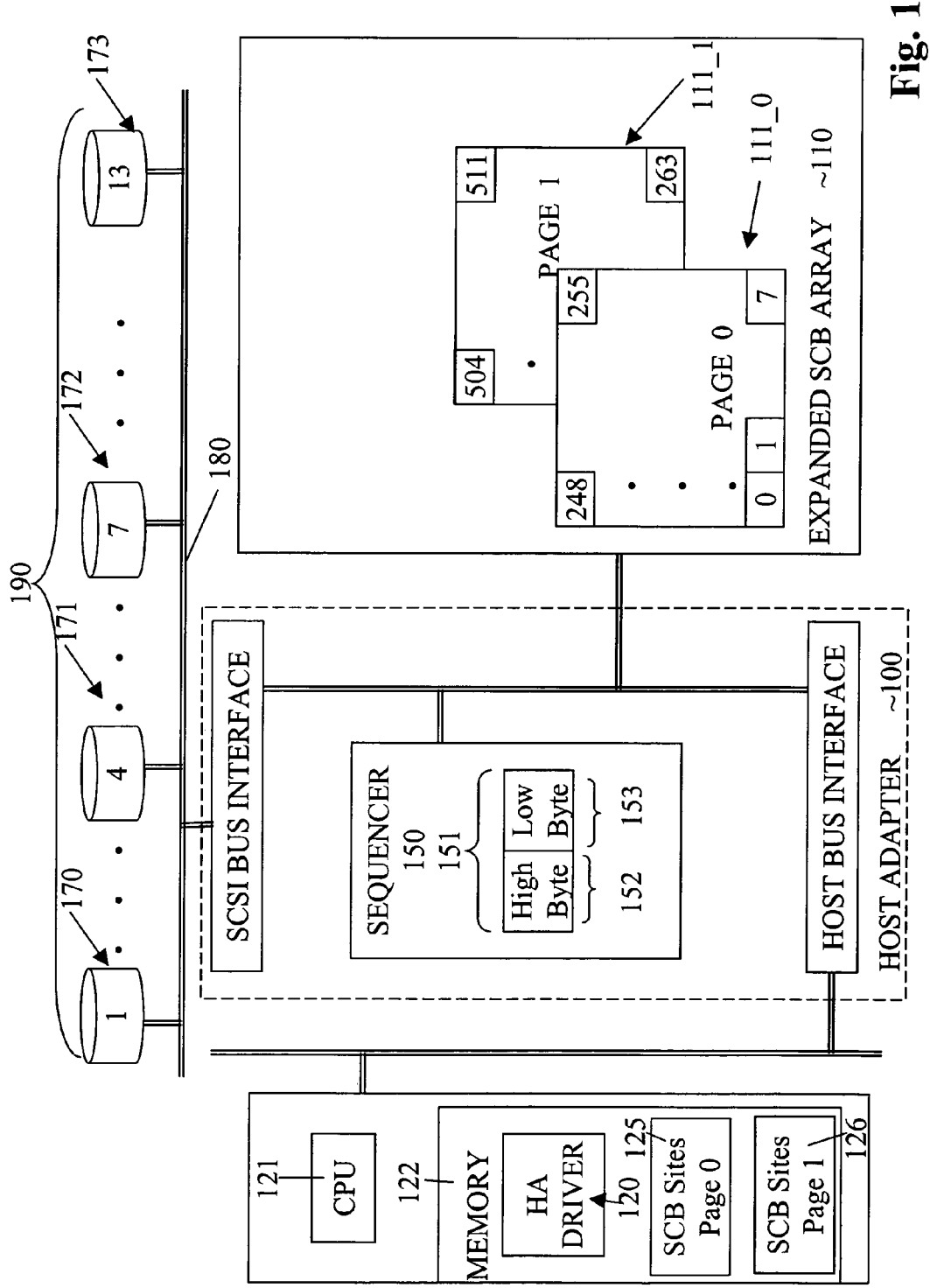
FIG. 1 is a block diagram that includes a paged hardware I/O control block array according to one embodiment of the present invention.

According to the principles of this invention, a parallel SCSI host adapter 100 (FIG. 1) uses an expanded SCB array 110 for both non-Packetized and Packetized SCSI Protocols. Herein, a SCB is an example of a hardware I/O control block. In this embodiment, expanded SCB array 110 is a memory array that is partitioned into a plurality of pages, which in this embodiment is two pages, a low page 111_0 and a high page 111_1. While in the embodiment of FIG. 1, the memory containing array 110 is external to host adapter 100, in another embodiment (not shown), the memory containing array 110 is internal to host adapter 100.

SCBs for non-Packetized SCSI Protocol target devices that utilize a one-byte tag are stored in low page 111_0, e.g., a first page. The number of the storage site in page 111_0 is used as the tag for non-Packetized SCSI Protocol target devices. SCBs for Packetized SCSI Protocol target devices that utilize a multi-byte tag, e.g., a two-byte tag, are stored on both low page 111_0 and high page 111_1 of expanded SCB array 110. For Packetized SCSI Protocol target devices, the two-bytes required to identify the page and the number of the storage site in the page are used as the tag. In one embodiment, as explained more completely below, SCBs for Packetized SCSI Protocol target devices are stored in low page 111_0 only if there are no available storage sites in high page 111_1, i.e., all the available storage sites in high page 111_1, e.g., a second page, are used.

Each storage site in expanded SCB array 100 is addressed using a two-byte pointer 151 that includes a low byte 153 and a high byte 152. When a non-Packetized SCSI Protocol target device, e.g., device 172, on SCSI bus 180 reconnects to host adapter 100, the one-byte tag is loaded in low byte 153 of pointer 151 and high byte 152 is set to zero. Thus, pointer 151 addresses the SCB storage site in low page 111_0 associated with the reconnecting target. When a Packetized SCSI Protocol target device, e.g., device 173, on SCSI bus 180 reconnects to host adapter 100, one byte of the two-byte tag is loaded in low byte 153 of pointer 151 and the other byte is loaded into high byte 152 of pointer 151. Thus, pointer 151 addresses the page and the SCB storage site in that page associated with the reconnecting target.

Low page 111_0, in one embodiment, includes a number of storage sites equal to a maximum number of commands that can be stored for a target on SCSI bus 180 that uses the non-Packetized SCSI Protocol. The maximum number of commands is equal to a number of unique tag values that can be returned by a non-Packetized SCSI Protocol tagged queue target reconnecting to parallel SCSI host adapter 100.

For the current non-Packetized SCSI Protocol tagged queuing, the tag is one byte, and so page 111_0 has two hundred fifty-six storage sites. In this embodiment, high page 111_1 also has two hundred fifty-six storage sites, e.g., sites 256 through 511. If the sequencer requires an invalid pointer, a value that is not on either page 111_0 or page 111_1 is used so that all 512 storage sites are available for use.

Figure 2:
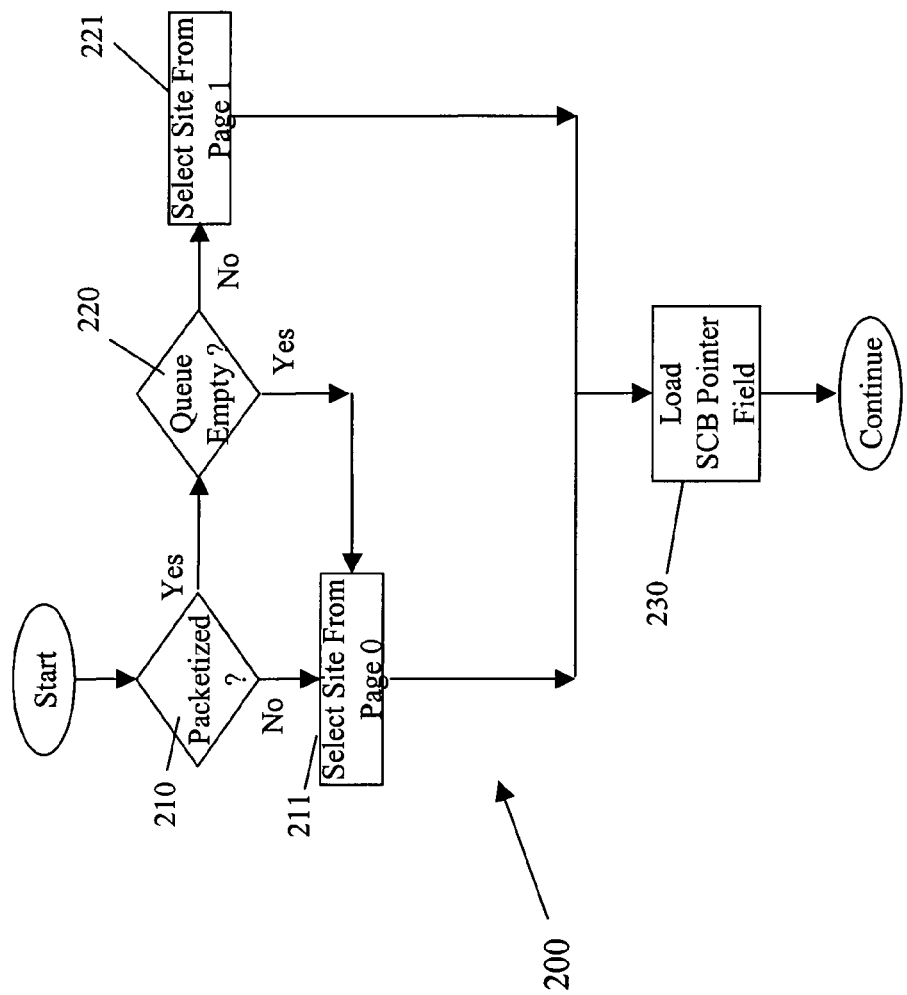
FIG. 2 is a process flow diagram for selecting a storage site in the paged hardware I/O control block array of FIG. 1 by a driver for the host adapter array according to one embodiment of the present invention.

FIG. 2 is a process flow diagram that is included in host adapter driver 120 to allocate SCB storage sites in this embodiment of the invention. As is known to those of skill in the art, host adapter driver 120 builds a SCB upon receiving a host I/O control block. Only the operations performed by host adapter driver 120 in association with this invention are presented in FIG. 2. The other operations are equivalent to those in the prior art and so are not included herein. In this embodiment, host adapter driver 120 executes on a processor 121 in a host system. In another embodiment, host adapter driver 120 executes within host adapter 100.

In packetized check operation 210, host adapter driver 120 determines whether the SCSI target device uses the non-Packetized or the Packetized SCSI Protocol. If the Packetized SCSI protocol is used check operation 210 transfers to queue empty check operation 220 and otherwise to select site from page zero operation 211.

In this embodiment, host adapter driver 120 maintains two page free site queues 125 and 126, e.g., a first page free site queue 125 and a second page free site queue 126. In one embodiment, each of page free site queues 125 and 126 contains two-byte pointers to unallocated sites in expanded SCB array 110. In another embodiment, page free queues 125 and 126 contain only the low bytes of two byte pointers. The high byte of the pointer is provided based upon the queue selected, e.g., for queue 125, the high byte is set to zero, and for queue 126, the high byte is set to one.

Low-page free site queue 125, sometimes called page free site queue 125, contains pointers to unallocated sites in low page 111_0, while high-page free site queue 126, sometimes called page free site queue 126 contains pointers to unallocated sites in high page 111_1. Specifically, the high-byte of the pointer identifies the page, and the low byte of the pointer identifies the number of the storage location in the page.

Thus, if the target device uses the non-Packetized SCSI protocol, host adapter driver 120 selects a site from low-page free site queue 125 for page 111_0 in operation 211. Operation 211 transfers processing to load SCB pointer field operation 230.

If the target device uses the Packetized SCSI protocol, host adapter driver 120 determines whether high-page free site queue 126 is empty. If high-page free site queue 126 is empty, which means all available storage site on page 111_1 are used, check operation 220 transfers to select site from page zero operation 211 and otherwise to select site from page one operation 221.

Select site from page one operation 221 selects a site on page 111_1 from high-page free site queue 126 and transfers to load SCB pointer field operation 230. As described above, operation 211 selects a site on page 111_0 from low-page free site queue 125 and transfers to load SCB pointer field operation 230 that loads the two-byte pointer in the SCB being built.

After host adapter driver 120 builds the SCB, the SCB is moved to expanded SCB array 110. The SCB is stored in the site specified by the two-byte pointer in the SCB.

Thus, host adapter driver 120, using method 200, allocates SCB sites for target devices that use a two-byte tag by drawing multiple-byte pointers first from high-page free site queue 126. Only when high-page free site queue 126 is empty does host adapter driver 120 select a site from low-page free site queue 125 for a target device that uses a two-byte tag. This method of site allocation in expanded SCB array 110 assures that the maximum possible number of sites in array 110 is available for non-Packetized SCSI SCBs, i.e., for target devices that use a single-byte tag. In addition, this method of site allocation assures that additional sites are available for Packetized SCSI SCBs when sites in high page 111_1 are unavailable.

Figure 3:
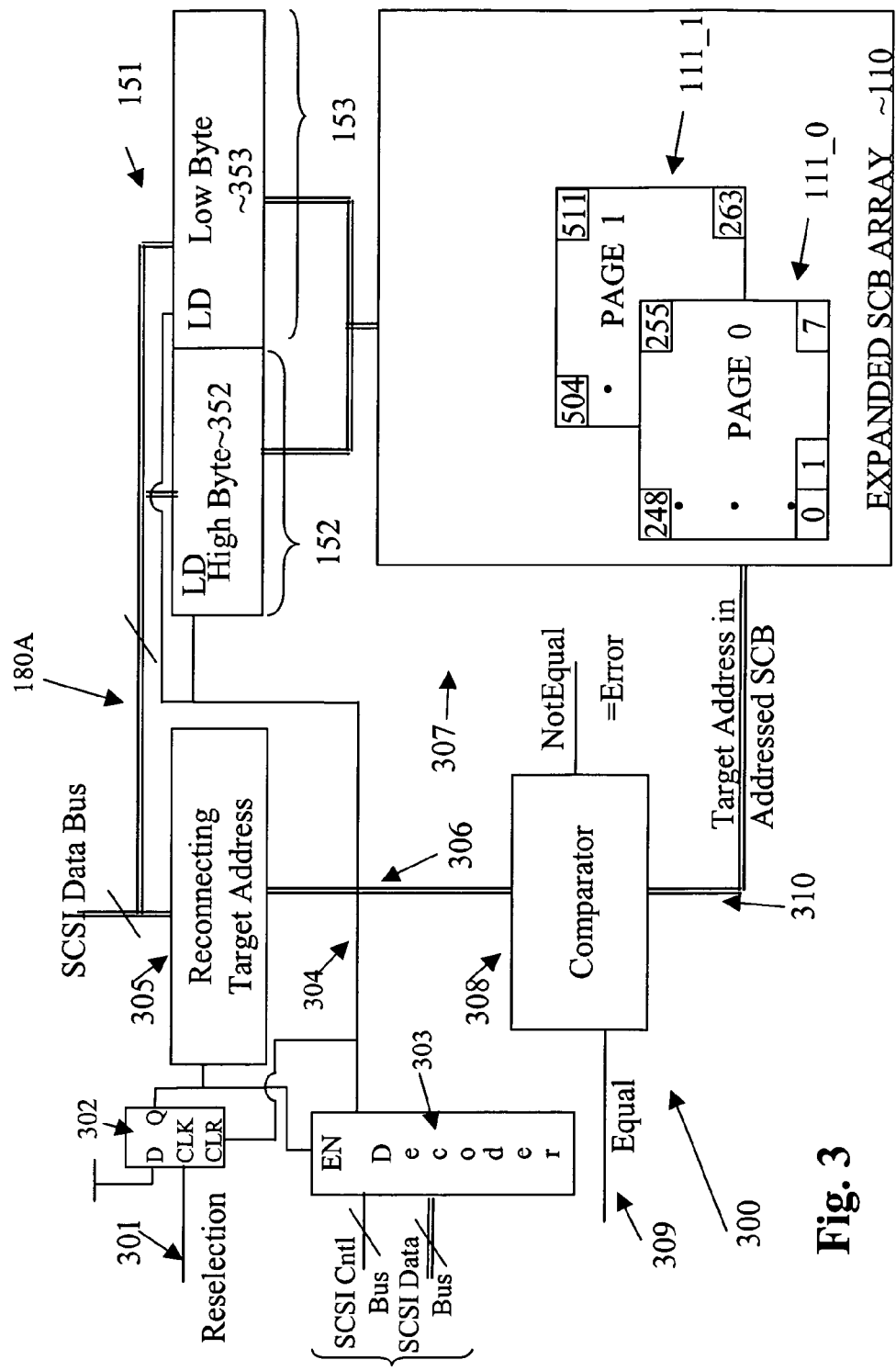
FIG. 3 is an illustration of one embodiment of a circuit for addressing the hardware I/O control block array of this invention using a tag supplied by reconnecting target.

For example, FIG. 3 is a high-level block diagram of one embodiment of a circuit configuration 300 in host adapter 100 that utilizes expanded SCB array 110. Alternatively, use of expanded SCB array 110 is implemented by instructions executed by sequencer 150. FIG. 3 is illustrative only and is not intended to limit the invention to this particular configuration. In a particular host adapter that supports both non-Packetized and Packetized SCSI protocols, one of skill in the art in view of the description herein can implement the invention in that host adapter.

When a SCSI phase. RESELECTION for reconnecting target 172, for example, is indicated on SCSI bus 180, an active signal is driven on line 301 to a clock terminal CLK of register 302. In response to the signal going active on terminal CLK, register 302 drives an active signal on output terminal Q, which in turn results in an active signal (i) on a load terminal LD of reconnecting target address register 305 that in turn loads register 305, and (ii) on an enable terminal EN of decoder circuit 303 that in turn enables decoder circuit 303.

Thus, the signal going active on line 301 results in the loading of the target ID on SCSI data bus 180A into reconnecting target address register 305 that is also connected to a first input of a comparator 308.

After being enabled, decoder 303 determines when the tag is available on SCSI bus 180 and generates an active signal on line 304 at the appropriate time. Prior art host adapters included circuitry to capture the tag on SCSI bus 180 for both non-Packetized and Packetized SCSI Protocols. Accordingly, this circuitry is modified to be responsive to the enable signal and to provide the signal on line 304 to decoder 303.

The active signal on line 304 is applied to a load terminal of a high byte register 352 that stores a high byte 152 of SCB array pointer 151, and to a load terminal of a low byte register 353 that stores a low byte 153 of SCB array pointer 151. In response to the rising edge on the load terminal, the tag on SCSI bus 180 is loaded into registers 352 and 353. If a single byte tag is on SCSI data bus 180A, a zero value is loaded into register 352. The active signal on line 304 also is applied to a clear terminal of register 302, with a delay if necessary, so that the circuitry is ready for the next target reselection.

The output signals from register 353 and register 352 are used to address the SCB at the SCB array site specified by the value in register 353 on either page zero 111_0 in extended SCB array 110 or page one 111_1 in extended SCB array 110. The SCSI target address stored in the addressed SCB is a first input signal to comparator 308 and a second input signal to comparator 308 is the reconnecting target address in register 305.

If the two input SCSI target addresses are equal, comparator 308 drives an active signal on a first output line 309, and otherwise an active signal on a second output line 307. If the addresses are not equal, the active signal on line 307 is an error signal.

When a SCB completes execution, host adapter 100 notifies host adapter driver 120 of the completion. Host adapter driver 120 determines which SCB was completed and adds the storage site used by the completed SCB back to the appropriate one of low-page free site queue 125 and high-page free site queue 126.

The method of SCB site management according to the present invention is simple and requires virtually no changes to sequencer firmware when the size of the SCB array is expanded. The host adapter driver maintains two page free site queues in place of one queue. However, for any given size of the SCB array, the total size of the two free site queues is the same as a single queue supporting the same size array. Consequently, this method does not change the resource requirements of the host adapter driver.

The embodiments of the present invention described herein are illustrative only, and are not intended to limit the invention to the particular embodiments. Hence, in view of this disclosure, those of skill in the art can implement a SCSI host adapter system with a paged hardware I/O control block array for both Packetized and non-Packetized SCSI protocols in a wide variety of configurations and in a wide variety of SCSI initiators.

I claim:

1. A method for using a hardware I/O control block array by a parallel SCSI host adapter, said method comprising:
    partitioning said hardware I/O control block array for said parallel SCSI host adapter into first and second pages;
    using only said first page for non-Packetized SCSI Protocol hardware I/O control block storage; and
    using said first and second pages for Packetized SCSI Protocol hardware I/O control block storage.

2. The method of claim 1 wherein using said first and second pages for Packetized SCSI Protocol hardware I/O control block storage further comprises:
    using said first page only when all available storage sites on said second page are used.

3. The method of claim 1 further comprising:
    maintaining a first page free site queue for said first page by a driver for said parallel SCSI host adapter.

4. The method of claim 3 further comprising:
    maintaining a second page free site queue for said second page by said driver for said parallel SCSI host adapter.

5. The method of claim 1 further comprising:
    maintaining a second page free site queue for said second page by a driver for said parallel SCSI host adapter.

6. The method of claim 1 further comprising:
    using a hardware I/O control block array pointer having a low byte and a high byte to address a storage site in said hardware I/O control block array.

7. The method of claim 6 further comprising:
loading a tag from a reconnecting target into said low byte only.

8. The method of claim 7 further comprising:
loading said high byte with a zero value.

9. The method of claim 6 further comprising:
loading a tag from a reconnecting target into said low byte and said high byte.

10. A system comprising:
a parallel SCSI host adapter comprising;
  a sequencer; and
  a hardware I/O control block array pointer, coupled to said sequencer, having a low byte and a high byte; and
a memory, coupled to said hardware I/O control block array pointer, including a hardware I/O control block array comprising:
  a plurality of pages including a first page and a second page,
    wherein said first page includes a plurality of hardware I/O control block storage sites equal to a number of unique tag values that can be returned by a non-Packetized SCSI Protocol tagged queue target reconnecting to said parallel SCSI host adapter; and
  said second page includes another plurality of hardware I/O control block storage sites.

11. The system of claim 10 wherein said memory is external to said parallel SCSI host adapter.

12. The system of claim 10 wherein said memory is internal to said parallel SCSI host adapter.

13. The system of claim 10 further comprising:
a driver coupled to said parallel SCSI host adapter, wherein said driver allocates and de-allocates storage sites in said hardware I/O control block array.

14. The system of claim 13 wherein said driver allocates sites for non-Packetized SCSI hardware I/O control blocks only in said first page.

15. The system of claim 13 wherein said driver allocates sites for Packetized SCSI hardware I/O control blocks in said first page and in said second page.

16. The system of claim 15 wherein said driver allocates sites for Packetized SCSI hardware I/O control blocks in said first page only when all available sites in said second page are used.

17. The system of claim 13 further comprising:
a first page free site queue coupled to said driver.

18. The system of claim 17 further comprising:
a second page free site queue coupled to said driver.

19. The system of claim 13 further comprising:
a second page free site queue coupled to said driver.

20. A method for using a hardware I/O control block array by a parallel SCSI host adapter, said method comprising:
partitioning said hardware I/O control block array for said parallel SCSI host adapter into first and second pages; and
using only said first page for non-Packetized SCSI Protocol hardware I/O control block storage;
using said first and second pages for Packetized SCSI Protocol hardware I/O control block storage;
maintaining a first page free site queue for said first page by a driver for said parallel SCSI host adapter;
maintaining a second page free site queue for said second page by said driver for said parallel SCSI host adapter;
using a hardware I/O control block array pointer having a low byte and a high byte to address a storage site in said hardware I/O control block array; and
loading a tag from a reconnecting target into said hardware I/O control block array pointer.

* * * * *